(12) United States Patent
Schöb et al.

(10) Patent No.: US 6,634,224 B1
(45) Date of Patent: Oct. 21, 2003

(54) METHOD FOR THE DETERMINATION OF THE PRESSURE IN AND/OR OF THE THROUGH-FLOW THROUGH A PUMP

(75) Inventors: Reto Schöb, Volketswil (CH); Natale Barletta, Zürich (CH); Jürgen Hahn, Zürich (CH)

(73) Assignee: Levitronix LLC, Waltham, MA (US)

( * ) Notice: Subject to any disclaimer, the term of this patent is extended or adjusted under 35 U.S.C. 154(b) by 0 days.

(21) Appl. No.: 09/359,526

(22) Filed: Jul. 22, 1999

(30) Foreign Application Priority Data

Jul. 10, 1998 (EP) .............................. 98810657

(51) Int. Cl.[7] .............................. B01F 1/05; B01F 1/56
(52) U.S. Cl. ..................... 73/168; 415/118; 416/43
(58) Field of Search ........................... 73/168; 415/118; 416/31, 43, 47, 42; 417/18, 20, 22

(56) References Cited

U.S. PATENT DOCUMENTS

| | | | |
|---|---|---|---|
| 3,649,137 A | * 3/1972 | Laing | 310/104 |
| 4,341,111 A | 7/1982 | Husar | 73/63.42 |
| 4,779,614 A | 10/1988 | Moise | 600/16 |
| 4,781,525 A | 11/1988 | Hubbard et al. | 415/30 |
| 5,036,236 A | * 7/1991 | Wilson | 310/90.5 |
| 5,104,284 A | * 4/1992 | Hustak, Jr. et al. | 277/317 |
| 5,127,792 A | * 7/1992 | Katsuta et al. | 415/104 |
| 5,350,283 A | * 9/1994 | Nakazeki et al. | 310/90.5 |
| 5,613,831 A | 3/1997 | Liegat | 415/229 |
| 5,725,357 A | 3/1998 | Nakazeki et al. | 417/18 |
| 5,857,348 A | * 1/1999 | Conry | 417/423.12 |
| 5,911,558 A | * 6/1999 | Nakazeki et al. | 415/118 |
| 6,074,180 A | * 6/2000 | Khanwilkar et al. | 415/900 |
| 6,100,618 A | * 8/2000 | Schoeb et al. | 310/90.5 |

FOREIGN PATENT DOCUMENTS

WO WO 9631934 A1 * 10/1996 ............ H02K/7/09

* cited by examiner

Primary Examiner—Hezron Williams
Assistant Examiner—David Rogers
(74) Attorney, Agent, or Firm—William Michael Hynes; Townsend and Townsend and Crew LLP

(57) ABSTRACT

In the method for the determination of the pressure (p) in and/or of the through-flow (Q) of a liquid through a pump having at least one magnetic bearing for the axial journaling of the pump rotor (1), axial forces act on the rotor (1) of the pump during operation. The axial forces which act on the rotor are utilised for the determination of the pressure (p) and/or of the through-flow (Q).

27 Claims, 6 Drawing Sheets

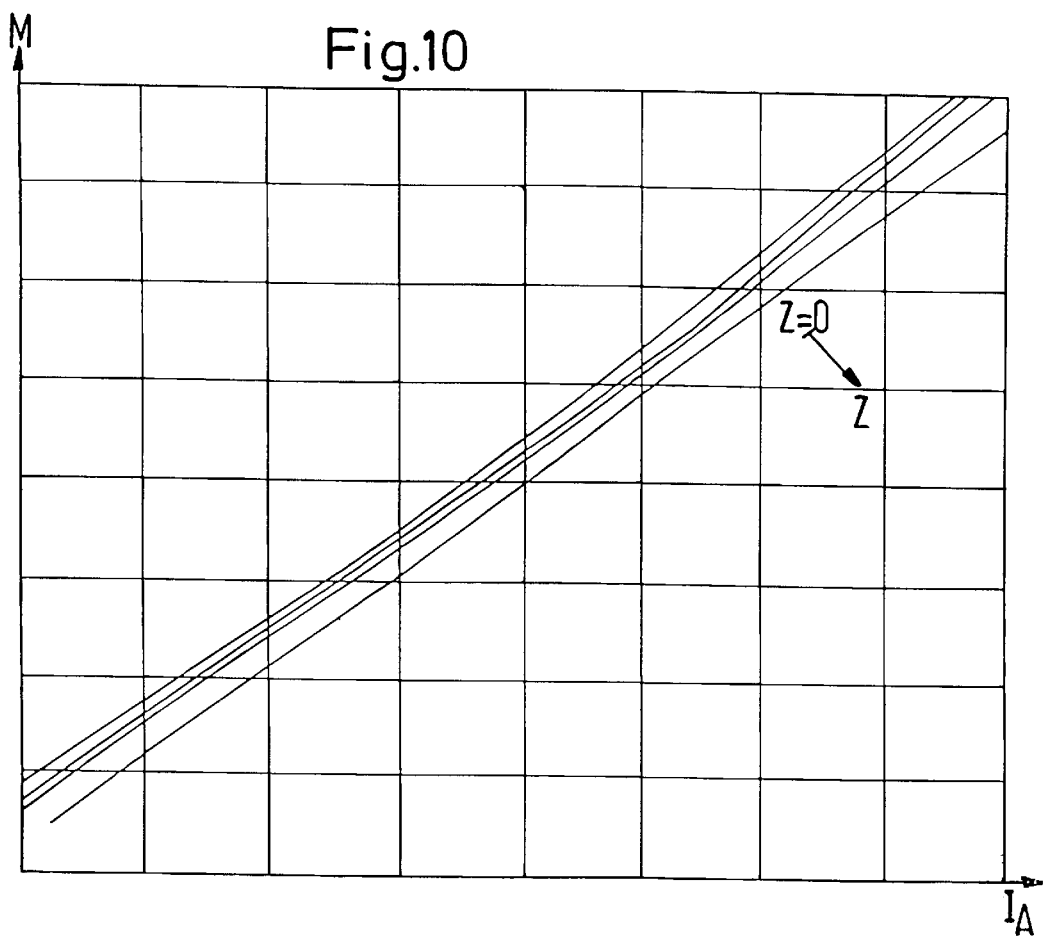
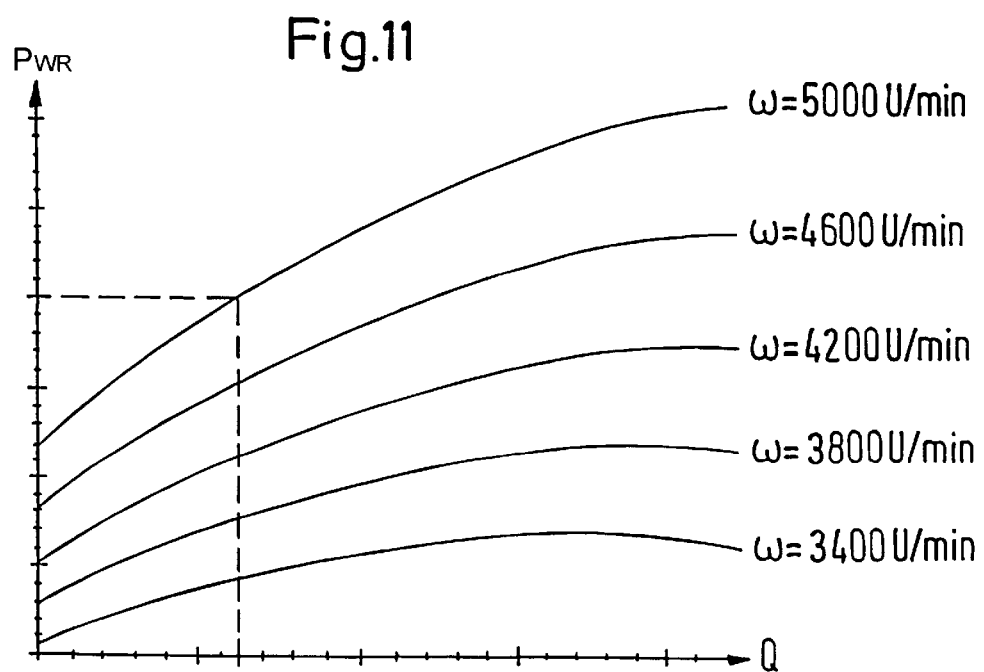

METHOD FOR THE DETERMINATION OF THE PRESSURE IN AND/OR OF THE THROUGH-FLOW THROUGH A PUMP

BACKGROUND OF THE INVENTION

The invention relates to a method for the determination of the pressure in and/or of the through-flow through a pump with at least one magnetic bearing for the axial journaling of the pump rotor.

Pumps in which the pump rotor is magnetically journaled are nowadays already being used in a number of fields of application. In particular—but not exclusively—these are applications in which mechanical journallings of the rotor cannot be tolerated as a result of possible contamination of the medium to be forwarded, such is for example the case in blood pumps. Here magnetic journallings of the rotor are the rule.

Pumps with magnetic journallings of the rotor are for example known from DE-A-196 13 388 (U.S. Pat. No. 5,735,357) or from U.S. Pat. No. 4,781,525. Pumps can be described in more detail through several characteristic parameters. Two important characteristic parameters of this kind are the pressure in a pump and the through-flow through a pump. These parameters can be determined in principle with corresponding devices for the pressure measurement and the through-flow measurement respectively, but this typically has the result that corresponding sensors must be provided in the pump. Precisely in blood pumps, however, it is desirable if these parameters can be determined without sensors.

For this it is proposed in the already named U.S. Pat. No. 4,781,525 to determine the through-flow in such a manner that the torque by means of which the rotor is driven is determined (via the current by means of which the rotor is driven) at a constant viscosity of the liquid to be forwarded and at a predetermined speed of rotation of the rotor. At constant viscosity this torque is linearly related to the through-flow according to U.S. Pat. No. 4,781,525 (column 1, lines 57 ff., column 3, lines 50 ff.). The through-flow is determined with the help of various tables (see FIG. 2 of U.S. Pat. No. 4,781,525), each of which represents the linear relationship between the torque and the through-flow for a constant viscosity. It is noted that this linear relationship firstly holds only very approximately and secondly is valid only for limited through-flow amounts. Considered realistically, the relationship between the torque and the through-flow (at a predetermined speed of rotation) is not linear, however; this holds all the more above a certain through-flow amount.

SUMMARY OF THE INVENTION

It is an object of the invention to be able to determine the pressure in and/or of the through-flow through a pump of this kind without sensors (thus without special sensors for pressure and through-flow) and in this to obtain values for the pressure and the through-flow which are as realistic as possible without the need to measure the pressure and the through-flow directly. The present invention is dedicated to this object.

In accordance with the invention a method is proposed in which the pump used has at least one magnetic bearing for the axial journalling of the pump rotor, with axial forces acting on the rotor during the operation of the pump. For the determination of the pressure and/or of the through-flow, the axial forces which act on the rotor are utilized in the method in accordance with the invention. The axial forces which act on the rotor can be simply determined in various manners.

The axial forces (axial thrust) which act on the pump rotor are namely dependent on the pressure difference between the inlet side of the pump (e.g. centrifugal pump, diagonal pump, axial pump) and its outlet side. Therefore the axial forces (axial thrust) which act on the pump rotor can be used in order to determine this pressure difference—this pressure difference is generally designated as the "pressure" in the pump.

In a method variant the axial magnetic bearing of the pump rotor is designed as an active journalling. For the determination of the axial forces which act on the rotor then the bearing current which is required in each case for the axial journalling of the rotor is utilized.

In another method variant the axial magnetic bearing of the pump rotor is designed as a passive journalling. For the determination of the axial forces which act on the rotor the axial deflection of the rotor is then utilized.

Depending on the type of the axial magnetic journalling (active or passive respectively) different journalling currents which are required for the axial journalling of the rotor or different axial deflections of the rotor respectively at different speeds of rotation as well as the respective pressures resulting therefrom can in each case be stored in a look-up table. This look-up table is prepared prior to the practical use of the pump. During the operation of the pump the respective journalling current or the respective axial deflection of the rotor respectively and its speed of rotation are then determined, and with the help of this look-up table the pressure resulting therefrom is then determined.

Since larger item numbers of a pump type are regularly manufactured, the look-up table need be generated only a single time, insofar as it is ensured that the manufactured pumps remain within predetermined tolerances. Of course it is also possible to generate and store a look-up table of this kind for each individual pump, through which however the cost and complexity is increased; but the precision is also increased in return.

As an alternative to the look-up table the pressure in the pump can be determined—depending on the kind of the axial journalling (active or passive respectively)—with the help of a polynomial from the respective journalling current which is required for the axial journalling of the rotor or from the respective axial deflection of the rotor respectively on the one hand as well as from the respective speed of rotation on the other hand. A polynomial of this kind likewise permits the pressure in the pump to be determined with a sufficient precision.

The higher the precision requirements are in this situation, the higher will be the order of the polynomial as well, and the greater will be the computational effort. In this the coefficients of the polynomial are likewise determined prior to the practical use of the pump. Here as well it holds that the coefficients for a given pump type need only be determined a single time when predetermined manufacturing tolerances are observed. They can also be determined individually for each individual pump, however, which increases the precision, but also increases the cost and complexity.

In a further development of the above-named method variant the through-flow through the pump is determined from the already established pressure and the associated speed of rotation. The determination of the through-flow is done via the pressure-through-flow characteristics of the pump (also called "restrictor curves").

These pressure-through-flow characteristics of the pump can again be stored in an electronic look-up table which has been generated prior to the practical use of the pump, either once for each pump type or for each pump separately. During the operation of the pump the through-flow through the pump is then determined with the help of this look-up table from the already established pressure.

Alternatively to the look-up table, the pressure-through-flow characteristics can be approximated by a polynomial so that during the operation of the pump the through-flow through the pump is then determined from the already established pressure with the help of this polynomial. The above considerations hold for the generation of the polynomial.

In a variant of the above-named method a pump with sensors for the determination of the direction of the magnetic field in the gap between the rotor and the stator is used. These sensors (typically Hall sensors) are also used in this method variant for the determination of the axial deflection of the rotor.

In this method variant the through-flow through the pump can be determined in that the torque which drives the rotor and the speed of rotation of the rotor are determined. For the determination of the torque the magnetic drive flux in the gap between the rotor and the stator and the drive current for the rotor are determined on the one hand and the axial deflection of the rotor is determined on the other hand. From the drive current and the axial deflection of the rotor the driving torque is then determined so that finally the through-flow through the pump is determined from the thus established torque and the established speed of rotation.

For this, different drive currents at different axial deflections of the rotor and the respective torque resulting therefrom can be stored in an electronic look-up table which has been generated and stored prior to the practical use of the pump. During the operation of the pump the torque is first determined from the respective axial deflection of the rotor and the respective axial drive current with the help of this look-up table. Then the through-flow through the pump is determined from the thus established torque and the established speed of rotation.

This determination of the through-flow of the pump from the established torque and the speed of rotation of the pump rotor is done via the so-called power-flux characteristics. These power-flux characteristics are basically non-linear (in contrast to the linear assumption for the relationship between the flux and the torque in U.S. Pat. No. 4,781,525, which is named above) and can be stored in the form of an electronic look-up table; they can however also be approximated by a polynomial.

In a further development of the above-named method variant the pressure in the pump is determined from the already established through-flow and the associated speed of rotation via the pressure-through-flow characteristics ("restrictor curves").

These pressure-through-flow characteristics ("restrictor curves") of the pump can, as already mentioned above, be stored in an electronic look-up table so that during the operation of the pump the pressure in the pump is then determined from the already established through-flow with the help of this look-up table.

Alternatively, the pressure-through-flow characteristics ("restrictor curves") can be approximated by a polynomial, as has likewise been mentioned above, so that during the operation of the pump the pressure in the pump is determined from the already established through-flow with the help of this polynomial.

Those method variants described above in which the through-flow is determined started from a given viscosity. If it is now desired to increase the precision, then the viscosity of the fluid in the pump can be determined for the purpose of the determination of the through-flow from the previously established pressure or for the purpose of the determination of the through-flow from the torque and the speed of rotation respectively. For this the following variants are available.

In a first variant, for the determination of the viscosity of the liquid, the pressure which is established with the help of the axial forces which act on the rotor is compared with the pressure which results from the determination with the help of the established torque and the established speed of rotation. For this the pressure must however also be determined in both ways. The viscosity is then determined from the difference of these two pressures and from the associated speed of rotation.

In a second variant the liquid damping which acts on the rotor is established for the determination of the viscosity of the liquid, and the viscosity is then determined from the established liquid damping. This is possible because each magnetic bearing can be characterized by its stiffness and by its damping. Considered physically the viscosity is a measure for the liquid friction (which is proportional to the speed) and thus has the effect of a damping.

If the magnetically journalled rotor is now located in a liquid, the total damping of the systems is above all increased in comparison with the operation in air. Since the total damping of the system is substantially additively composed of the damping of the magnetic bearing and the liquid damping, the liquid damping forms a measure for the viscosity of the liquid. The liquid damping can now be determined either directly or indirectly via the system damping (which is of course additively composed of the known damping of the magnetic bearing and of the liquid damping). For this a plurality of variants are available.

In a first variant the liquid damping is determined with the help of the shifting of the eigen-frequencies (rigid body oscillations, bending deflection oscillations) of the rotor.

In a second variant the liquid damping is determined in that the rotor is operated at an eigen-frequency and the deflection of the rotor thereby produced is determined. With the help of the deflection of the rotor the liquid damping is then determined.

In a third variant the liquid damping is determined in that the speed of rotation of the rotor is varied with different frequencies and the variation of the axial journalling forces or of the axial deflection respectively which arises at the respective frequency of the variation of the speed of rotation is determined. The liquid damping is then determined from the variation of the axial journalling forces or of the axial deflection of the rotor respectively at different frequencies of the variation of the speed of rotation.

Finally in a fourth variant the liquid damping is determined in that the displacement of the stability boundary of the control circuit for the axial magnetic journalling of the rotor is determined. The liquid damping is then determined from this displacement of the stability boundary of the control circuit for the axial magnetic journalling of the rotor.

Once the viscosity has been determined, then, as already mentioned above, in those method variants in which the through-flow is determined from the previously established pressure (via the "restrictor curve") or in which the through-flow is determined from the torque and the speed of rotation (via the power-flux characteristics) respectively, the established viscosity can be taken into account, through which the precision of the values for the through-flow or the pressure respectively is increased even further.

The invention will be explained in the following with reference to the drawings.

BRIEF DESCRIPTION OF THE DRAWINGS

FIG. 10 is the theoretical graph of the drive torque in dependence on the drive current at different axial displacements of the rotor, FIG. 11 is an illustration of the relationship between the power and the through-flow in a pump ("power-flux characteristics")

DESCRIPTION OF THE PREFERRED EMBODIMENTS

As already mentioned in the introduction, axial forces act on the pump rotor as a result of the different pressures on the intake side and the output side of a pump (e.g. of a centrifugal pump, a diagonal pump or an axial pump)—thus at both sides of the pump rotor. These axial forces are dependent on the pressure difference between the two sides of the pump rotor. Due to this dependence of the axial forces on the pressure difference it is possible to determine the pressure difference—the "pressure" in the pump—with the help of the axial forces. This is easily possible in pumps with a magnetic journalling of the pump rotor because the axial forces which act on the pump rotor can be determined very precisely in a magnetic journalling of the pump rotor.

For an axially active magnetic journalling the following holds:

$$F = k_i \cdot i$$

with $k_i$=constant i=bearing current, whereas for an axially passive magnetic journalling the following holds:

$$F = k_z \cdot z$$

with $k_z$=constant z=deflection of the rotor in the z direction.

The following considerations are made with reference to passive axial magnetic journallings of the rotor, but hold in the transferred sense for active axial magnetic journallings as well.

Figure 1:
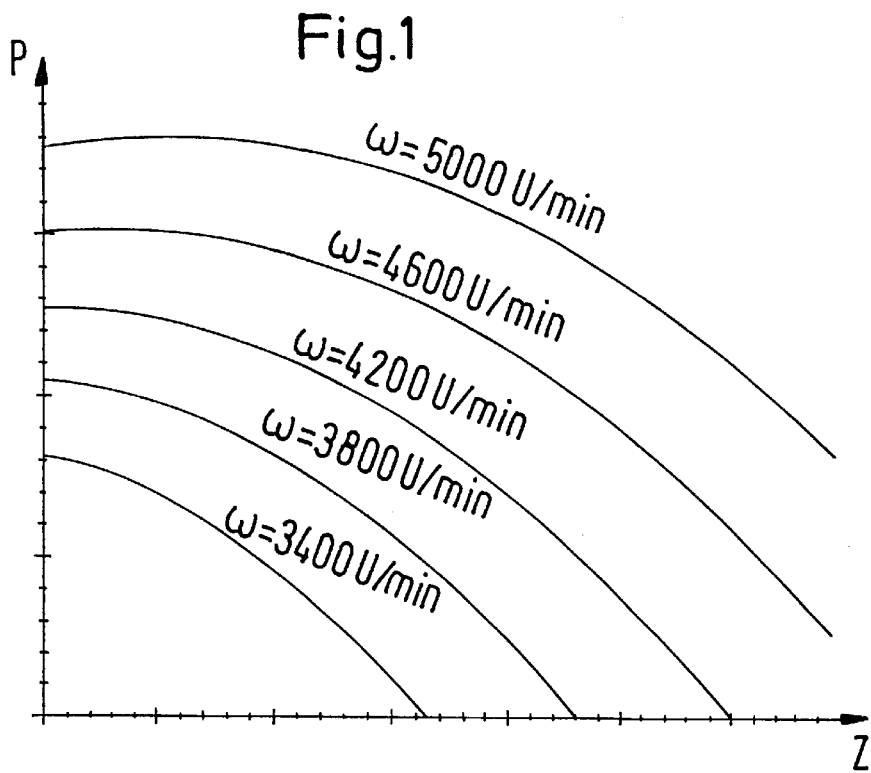
FIG. 1 is a graph of the relationship between the pressure and the axial deflection of the pump rotor.

The relationship between the pressure p (ordinate) and the deflection z of the rotor in the axial direction (abscissa) is illustrated in FIG. 1 for a passive axial magnetic journalling of the rotor for different (angular) rotational frequencies $\omega$. In the following the speed of rotation will always be spoken of for the sake of simplicity because the angular rotational frequency results directly from the speed of rotation—multiplied by the factor $2\pi$. The axial deflection z of the rotor is approximately directly proportional to the axial force which acts on the rotor and is thus a measure for the axial force which acts on the rotor.

This dependence of the pressure p on the axial deflection z of the rotor at different speeds of rotation can now be stored in the form of an electronic look-up table in the memory of a computer or microprocessor. This look-up table need be recorded only once for the respective pump type insofar as the manufacture of the individual pump parts remains within predetermined tolerances. It can however also be recorded separately for each individual pump, which improves the precision, but also increases the cost and complexity. In order to reduce the amount of data in this, several support points can be recorded. When deflections arise during operation which lie between the support points then the usual interpolation procedures are used.

Alternatively to the look-up table the dependence of the pressure p on the axial deflection z of the rotor can however also be described by a polynomial. The individual coefficients of this polynomial are correspondingly recorded and the pressure p is calculated during operation with the help of the angular rotational frequency w and the axial deflection z. A polynomial of this kind can for example have the form $$p = k_1\omega + k_2 z + k_3 \omega + k_4 \omega^2 + k_5 z^2 + k_6 \omega z^2 + k_7 \omega^2 z + k_8 \omega^2 z^2$$

with $k_i$=coefficients $\omega$=angular rotational frequency z=axial deflection of the rotor.

A pressure p which is determined with the help of this polynomial of eighth degree represents a very good approximation for the actual pressure. The precision can naturally be further increased through increasing the degree of the polynomial, but the computational effort also naturally increases therein.

Figure 2:
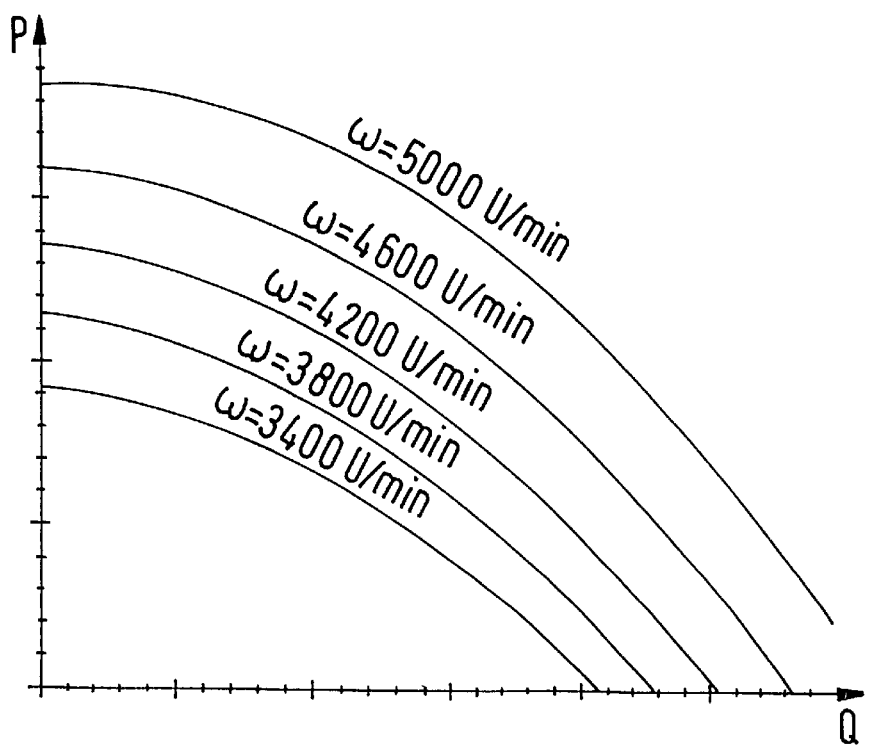
FIG. 2 is a graph of the relationship between the pressure and the through-flow in a pump ("restrictor curve")

Once the pressure p in the pump has been determined in this way (by means of a look-up table or by means of a polynomial approximation), then the through-flow Q through the pump can subsequently be determined with the help of the pressure-through-flow characteristic ("restrictor curve") of the pump. A restrictor curve of this kind is illustrated in FIG. 2; the relationship between the pressure p in the pump (ordinate) and the through-flow Q (abscissa) at different speeds of rotation $\omega$ (or angular speeds of rotation respectively) can be read off from it.

The restrictor curve can either again be stored in the form of a look-up table—as described above—or the through-flow can be calculated by a polynomial when the pressure is known (as described above). The advantage of this method naturally consists on the one hand in that the pressure p and the through-flow Q can be determined without sensors. The main advantage however consists in that it is not necessary to know the drive torque of the pump rotor (or, respectively, the motor current, which is proportional to this drive torque). This is a great advantage to the extent that many drive motors for pumps are either supplied with a fixed rotary voltage or—in converter operation—are operated in a voltage controlled manner so that the motor current is not measured at all and is thus not known to the drive regulator as a measured value.

Figure 3:
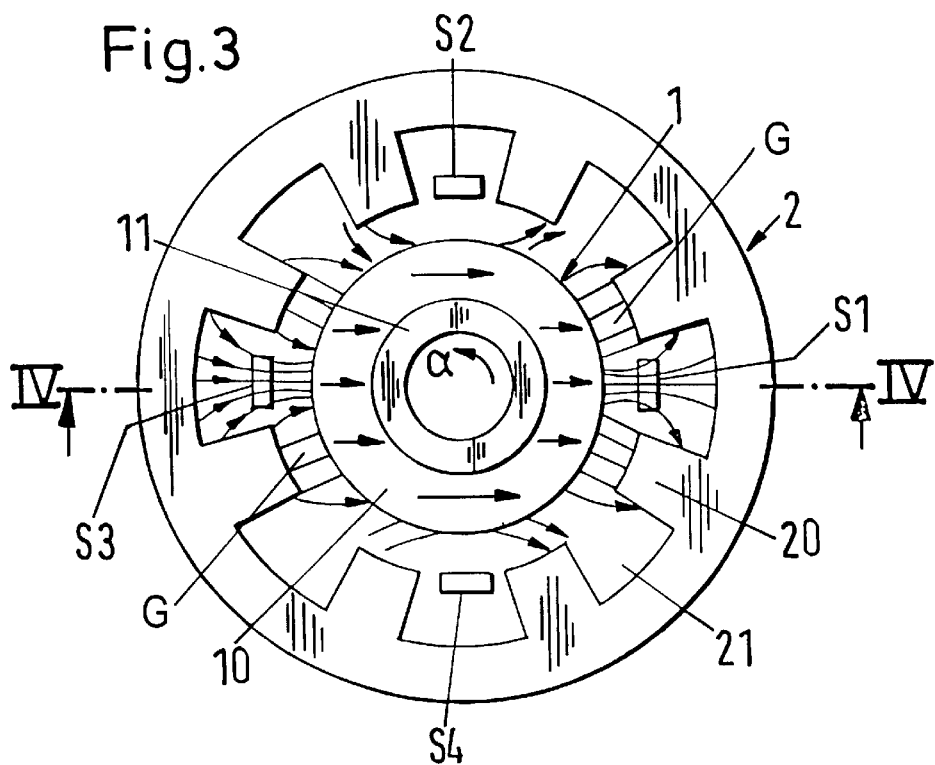
FIG. 3 is an exemplary embodiment of an axial passive journalling of a pump rotor with position sensors for the determination of the position of the rotor.
Figure 4:
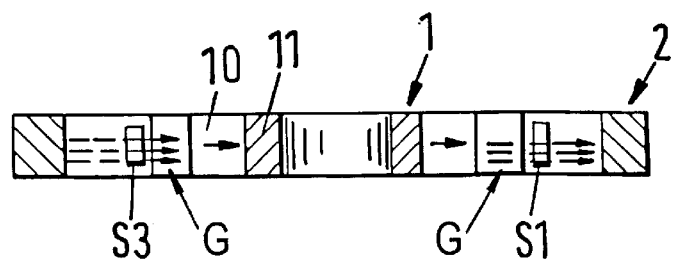
FIG. 4 is a section along the line IV—IV in FIG. 3.

In the following a further variant embodiment will be described. For this an exemplary embodiment of an axial passive journalling of a pump rotor is illustrated in FIG. 3 by the example of a bearing-free motor. FIG. 4 shows a section along the line IV—IV through the exemplary embodiment in accordance with FIG. 3. The field plot is also qualitatively indicated in these two figures. One recognizes a pump rotor 1 which comprises a ring-shaped magnet 10 and an iron yoke 11. The rotor 1 is surrounded by a stator 2, which here has a plurality of teeth 20 with grooves 21 lying between them. The arrows in the ring-shaped magnet 10 indicate the magnetization direction; the remaining arrows stand qualitatively for the distribution of the magnetic field in this rotor position.

In this exemplary embodiment four position sensors S1, S2, S3, S4 are arranged in each case in grooves 21 between the teeth 20. Through the teeth 20 there flows a magnetic control flux which derives from the windings (not illustrated) which are arranged about the teeth 20 and which serves for the controlling of the rotor position. With the help of the sensors S1, S2, S3, S4 the direction and strength of the magnetic field in the air gap G and thus the angle of rotation of the rotor 1 can be determined. The sensors are typically designed as Hall sensors.

In a variant embodiment of the invention the signal of the sensors S1, S2, S3, S4 is now used in order to determine the axial deflection of the rotor. The amplitude of the magnetic flux which is measured with the sensors varies namely with the axial deflection of the rotor. In this the arrangement of the sensors S1, S2, S3, S4 in grooves 21 is advantageous insofar as the previously mentioned control flux for the controlling of the rotor position is not also measured by the sensors.

Figure 5:
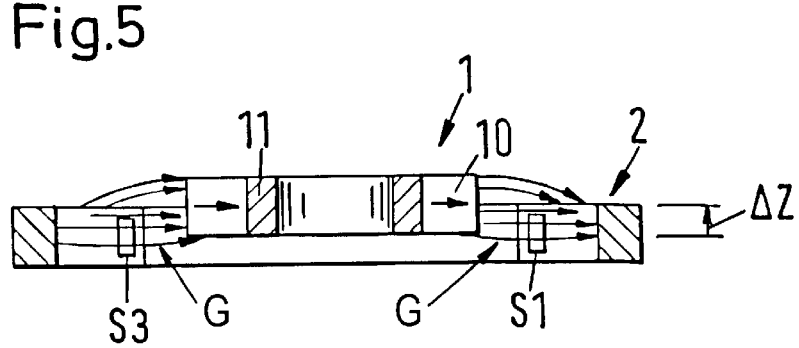
FIG. 5 is an illustration analogous to FIG. 4, however with an axially deflected rotor.

If one considers FIG. 5, in which the pump rotor 1 is deflected by a distance Δ from its rest position, then it is immediately evident that at the same angular position of the rotor 1, the magnetic flux which derives from the rotor 1 and which penetrates the sensors—here the sensors S1 and S3—is less than when the rotor is in its rest position. The sensor signal is therefore weaker.

Figure 6:
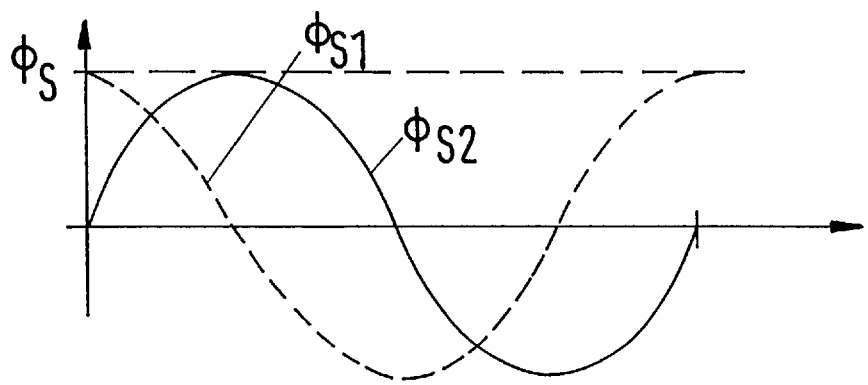
FIG. 6 is an exemplary plot of the magnetic flux through position sensors for the determination of the position of the rotor.

In principle both the angular position and the axial position or deflection respectively of the rotor 1 can already be determined by means of two sensors which are not displaced by a multiple of 180°, for example by means of the sensors S1 and S2. An example for the magnetic flux $\phi_s$ through the sensors S1, S2 (the signals of the sensors S3, S4 result from the multiplication of the signals of the sensors S1, S2 by the factor −1) is illustrated in FIG. 6.

In this the following relationships hold for the angle α and the deflection z:

$$\alpha = \arctan(\phi_{S1}/\phi_{S2})$$

and $$z = f[(\phi_{S1}^2 + \phi_{S2}^2)^{1/2}],$$

where $\phi_{S1}$ and $\phi_{S2}$ represent the magnetic flux through the sensors S1 and S2.

If four sensors are used, such as the sensors S1, S2, S3, S4 in the exemplary embodiment shown, then the thermal drift and the influence of the radial rotor position can be eliminated in this way (through the taking of differences). For the angle α and the axial deflection z of the rotor then, correspondingly, $$a = \arctan[(\phi_{S2} - \phi_{S4})/(\phi_{S1} - \phi_{S3})]$$

and $$z = f[((\phi_{S1} - \phi_{S3})^2 + (\phi_{S2} - \phi_{S4})^2)^{1/2}].$$

Figure 7:
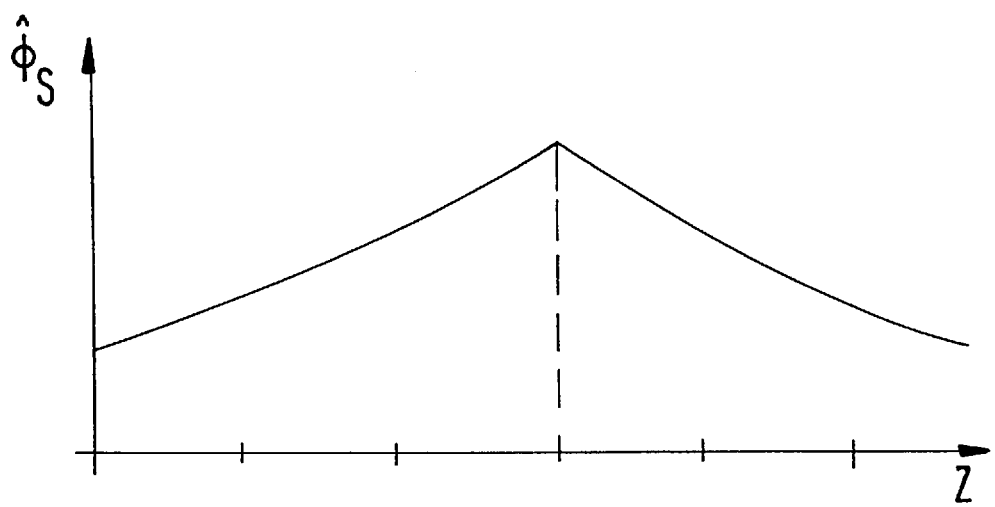
FIG. 7 is the theoretical plot of the amplitude of the magnetic flux through a position sensor in dependence on the axial deflection of the rotor.

In FIG. 7 a theoretical plot of the amplitude $\phi_s$ of the magnetic flux $\phi_s$ through a sensor is now illustrated. One recognizes from this illustration that, with the arrangement of the sensors as is shown in FIG. 4 or FIG. 5 respectively, the function $$z = f(\phi_s)$$

is not invertably unique (one to one). The magnetic flux is a maximum when the rotor 1 is in its rest position (no axial deflection) and becomes smaller both for a deflection in the axial direction which is positive and for one which is negative.

Figure 8:
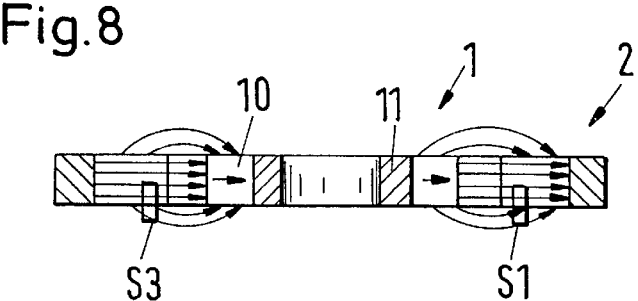
FIG. 8 is an exemplary embodiment for an axially displaced arrangement of the position sensors.

In order to eliminate this disadvantage one can now, as is shown in FIG. 8 with reference to an exemplary embodiment, arrange the sensors—here only the sensors S1 and S3 can be recognized—with a displacement in the axial direction with respect to the rest position of the rotor 1, in FIG. 8 downwardly.

Figure 9:
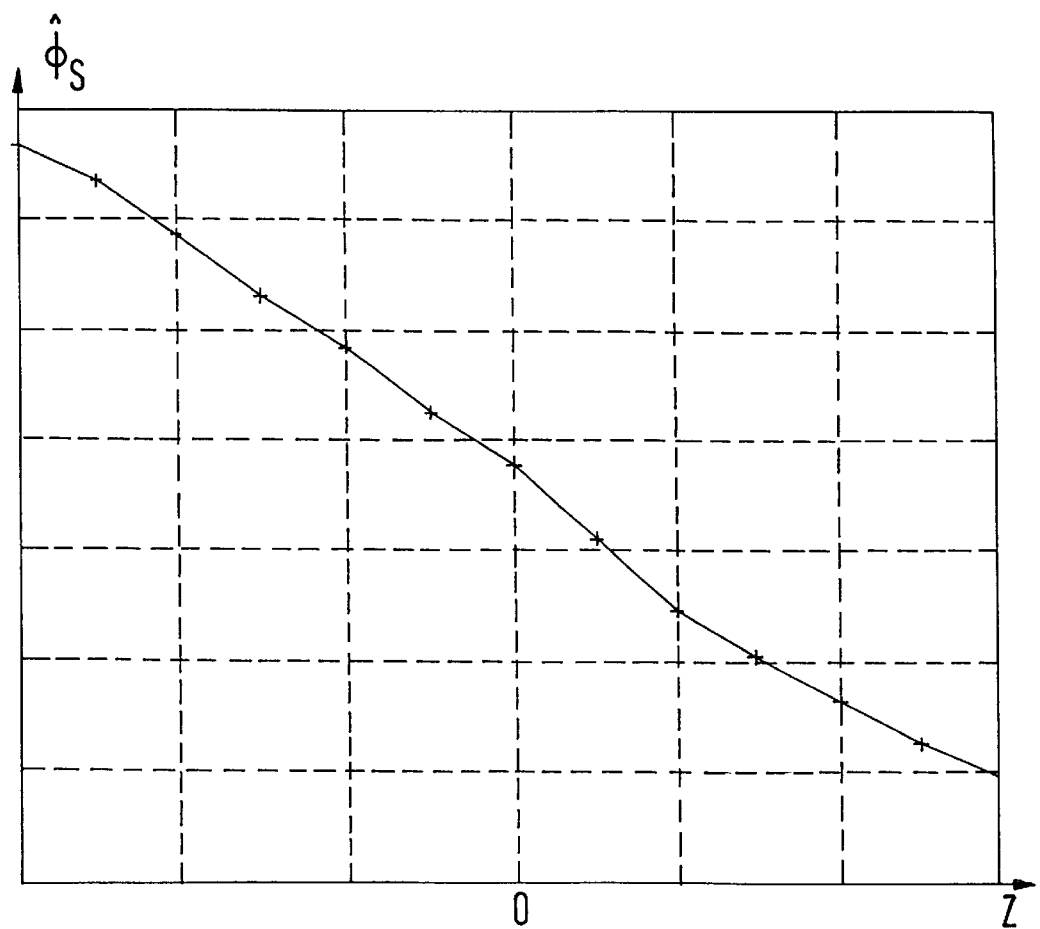
FIG. 9 is an exemplary plot of the magnetic flux in an arrangement with axially displaced position sensors.

FIG. 9 shows the path of the magnetic flux through the sensors in an arrangement with axially displacedly arranged sensors. One recognizes firstly that the functional dependence of the magnetic flux through the sensors is now invertably unique (one to one) and secondly that the relationship is already more or less linear, which is however not a prerequisite. The sensor signal achieves a maximum at a negative deflection and a minimum for a positive deflection. The unique determination of the axial rotor position from the sensor signals is now possible. The plot of the dependence of the magnetic flux on the axial deflection of the rotor 1, in particular the slight non-linearity of the plot, can easily be linearized by means of a look-up table with the help of a microprocessor.

In an axial deflection however the motor flux $\phi_M$, which is effective for the torque development, also becomes smaller and thus for a given drive current $I_A$ the drive torque M varies in dependence on the axial deflection z of the rotor 1.

One has:

$$M \sim \phi_M I_A$$

with $$\phi_M = f(z),$$

so that, as a consequence, $$M = f(z, I_A).$$

In FIG. 10 a plot of the drive torque M of this kind in dependence on the drive current $I_A$ is shown qualitatively, with the individual straight lines corresponding to different deflections of the rotor from its rest position. The uppermost straight line corresponds to the relationship between the drive current $I_A$ and the drive torque M at the rest position of the rotor, the lowermost straight line to the relationship between the drive current $I_A$ and the drive torque M at the maximum deflection of the rotor. One recognizes that the relationship between the drive torque M and the drive current $I_A$ also remains to a great extent linear in an axial deflection of the rotor from the rest position.

The dependence of the motor flux $\phi_M$ or the drive torque M respectively on the axial deflection z of the rotor can now again be stored in a look-up table. In this way the influence of the axial position of the rotor in the determination of the actually effective drive torque can be eliminated and one obtains an actually effective drive torque M which is independent of the axial deflection of the rotor.

For the power of the pump one has:

$$Pwr = M \cdot \phi$$

with

M=drive torque $\phi$=angular rotational frequency.

If now, as described above, the actual drive torque M (that is, that which is independent of the axial position of the rotor) is known, then the through-flow Q through the pump can be determined with the help of the power-flux characteristics.

An array of power-flux curves of this kind is illustrated in regard to its theoretical behavior in FIG. 11 for different (angular) speeds of rotation $\phi$. One recognizes here as well that the relationship between the through-flow Q and the power Pwr is non-linear. Furthermore, one also recognizes from this illustration that the linear relationship between the through-flow Q and the drive torque M in U.S. Pat. No. 4,781,525, which was named at the beginning in the discussion of the prior art, is valid at most in a limited range. In general the relationship between the through-flow Q and the power Pwr, and thus also the relationship between the through-flow Q and the drive torque M, is non-linear.

The power-flux characteristics of FIG. 11 for the pump can again be stored in the form of a look-up table, with it being necessary to record these characteristics only once for each pump type insofar as the pump parts remain within predetermined tolerances in the manufacture. Alternatively, a polynomial approximation can be made here as well, as has already been described above.

Once the through-flow Q through the pump has been established via the power-flux characteristics, then the pressure p in the pump can subsequently be determined via the pressure-through-flow characteristic ("restrictor curve"). The through-flow Q through the pump which is determined in this way and also the pressure p which is determined in this way are now however strongly dependent on the viscosity $\eta$ of the liquid to be forwarded:

$$Q_{real} = f_1 (Q_{calculated}, \eta)$$

$$P_{real} = f_1 (p_{calculated}, \eta).$$

On the other hand, the pressure p in the pump which is determined from the axial bearing force (see the variant which is described with reference to FIG. 1 and FIG. 2) is substantially independent of the viscosity $\eta$ of the liquid.

If thus one first determines the pressure $p_{real}$ via the axial force (that is, in active axial journallings of the rotor via the bearing current i, in passive axial journallings of the rotor via the axial deflection z) and then from $p_{real}$, then with the help of the drive torque M and the speed of rotation $\phi$ via the power Pwr of the pump, and from this with the help of the power-flux characteristics the through-flow Q and from the latter then the pressure $P_{calculated}$, then the viscosity $\eta$ can finally be determined from the values for $p_{real}$ and $p_{calculated}$. If the viscosity $\eta$ of the liquid is known, then the determination of the pressure p and the through-flow Q with the help of the power-flux characteristics, which are strongly dependent on the viscosity, can subsequently be determined more precisely.

It should be noted here that the determination of the through-flow Q and the pressure p by means of the power-flux characteristics without taking the viscosity into account, that is, when for a liquid of a given type a viscosity which is usual for this type of liquid is assumed, likewise yields good results. If however this precision is not sufficient or if a very high precision in the determination of the pressure p and the through-flow Q is desired e.g. in blood pumps, then a determination of the viscosity $\eta$ can be made in advance.

In the above-described method for the determination of the viscosity from $p_{calculated}$ and $p_{real}$ the functions $f_1$ and $f_2$ which are mentioned there are highly pump-specific and are normally available only in the form of measured characteristics, not however as mathematical functions. The characteristics are then preferably approximated by polynomials for the mathematical treatment.

Considered physically the viscosity $\eta$ is a measure for the liquid friction (which is proportional to the speed). As a result it has the form of a damping constant, and one has:

$$F_R \sim \eta \cdot v$$

with $F_R$=force of friction v=speed $\eta$=viscosity.

On the other hand, each magnetic bearing can be characterized by its stiffness $S_{ML}$ and by its damping $D_{ML}$. If the magnetically journalled rotor is now located in a liquid, then in comparison with the operation in air, above all the damping is increased. One has:

$$D_{tot} = D_{ML} + D_{FL}.$$

Through the direct determination of the liquid damping $D_{FL}$ or through the determination of the total damping $D_{tot}$ of the system a measure for the viscosity can then be found since the total damping is of course composed additively of the damping of the magnetic bearing and the liquid damping. In the following, different variants are described of how the system damping $D_{tot}$ or, directly, the liquid damping $D_{FL}$ in a pump with a magnetically journalled rotor can be determined.

In a first variant the liquid damping is determined with the help of the shifting of the eigen-frequencies of the rotor. Proper oscillations of the body can be subdivided into so-called rigid body oscillations, i.e. the body retains its external shape, and in bending oscillations. The eigen-frequencies of the rigid body oscillations are predetermined by the mass and the geometry of the rotor and by the magnetic bearing parameters stiffness $S_{ML}$ and $D_{ML}$. In the bending oscillations the material dampings of the rotor are also present since the rotor of course deforms in the process.

The eigen-frequencies can now be determined in various ways:

a) Through a broad-band excitation of the rotor (e.g. with the help of a rectangular wave signal or of a chirp signal) which is preferably oriented in the radial direction with the help of the magnetic bearing and through a spectral analysis of the signals of the (radial) position signals.

b) Through (axial) excitation of the rotor via an active magnetic bearing with a gliding sine wave or through sinusoidal test signals with discrete frequency-type steps and plotting of the rotor deflection (frequency response measurement).

c) Through excitation of the eigen-frequencies by means of perturbation forces which are synchronous with the speed of rotation (such as e.g. imbalance, hydraulic imbalance, blade forces), with the eigen-frequencies being passed through and the radial deflection of the rotor (orbit) being analyzed.

The eigen-frequencies of the rotor in air are either known or are determined. If the eigen-frequencies of the rotor in the liquid have been determined in one of the described ways, then the relationship between the shifting of the eigen-frequencies and the viscosity η resulting therefrom can be stored, e.g. in a look-up table.

Figure 12:
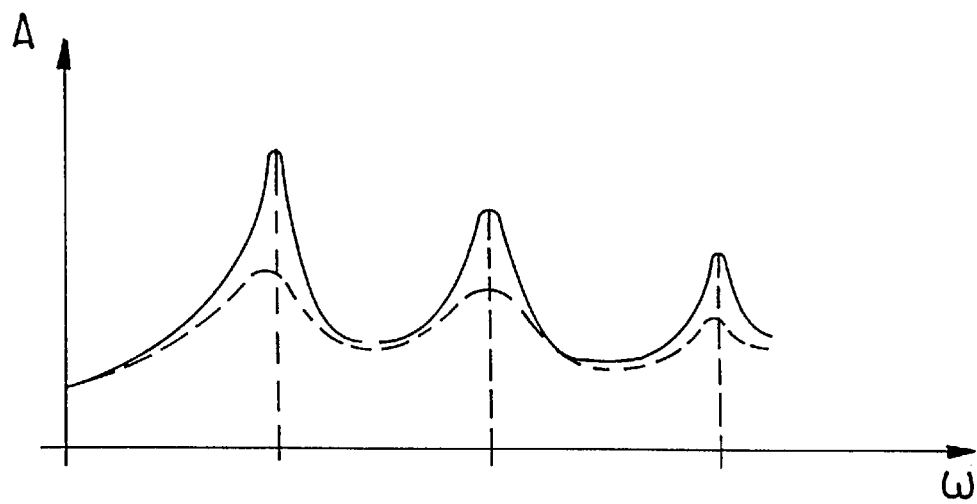
FIG. 12 is a qualitative illustration of the amplitude of the deflection of the rotor at a varying speed of rotation at two different viscosities of the liquid to be forwarded.

In a second variant the rotor is operated in the manner of an experiment with a speed of rotation which corresponds to an eigen-frequency of the rotor. In order to find an eigen-frequency of the rotor it is best to vary the speed of rotation or the magnetic bearing stiffness $S_{ML}$. The amplitude A of the deflection of the rotor (size of the orbit) is then a measure for the system damping $D_{tot}$, from which then the liquid damping $D_{FL}$ and from the latter the viscosity η can be determined (see e.g. FIG. 12; the broken line represents the liquid with the higher viscosity η). The amplitude of the deflection and the respective viscosity η resulting therefrom can then be stored in a look-up table so that the viscosity η can then be determined from the respective amplitude of the deflection.

In a third variant the speed of rotation is varied by a predetermined amount, for example by an amount of ±10%. When the speed of rotation varies, the axial bearing force also varies; in a passive magnetic bearing the axial deflection of the rotor also varies. In the event of a low frequency of variation of the speed of rotation the axial deflection is less dependent on the viscosity; in the event of a high frequency of variation of the speed of rotation this dependence is stronger. From the measurement at two or more frequencies of variation of the speed of rotation the liquid damping $D_{FL}$ can then be determined, and, from the latter, the viscosity η.

This relationship between the variation of the axial bearing force at two or more frequencies of variation of the speed of rotation or between the axial deflection of the rotor at two or more frequencies of variation of the speed of rotation respectively and the viscosity η resulting therefrom can then for example be stored in a look-up table.

Figure 13:
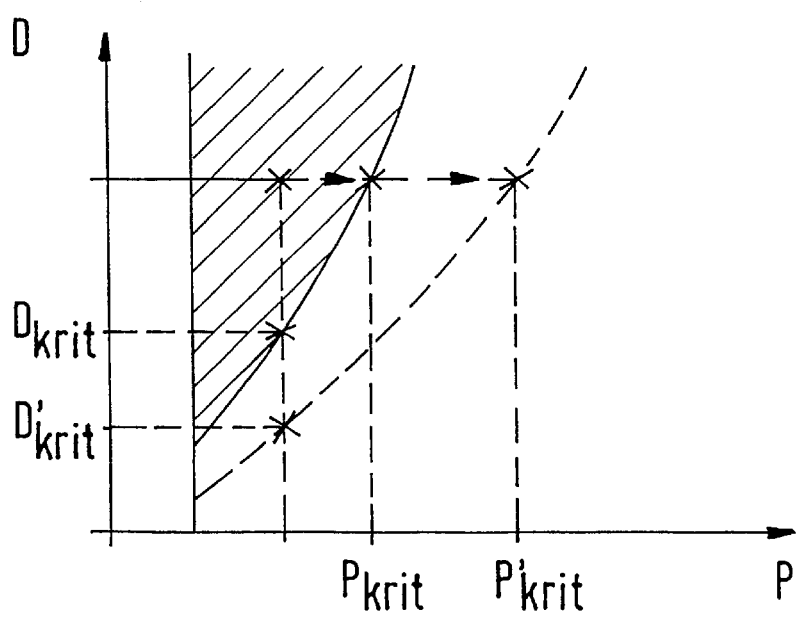
FIG. 13 is an illustration of the parameter region of a stable control circuit (PD-regulator) of the axial magnetic journalling of the rotor.

In a fourth variant the shifting of the stability boundary of the closed control circuit for the axial magnetic bearing is determined. The parameter region in which a stable operation of the control circuit is possible is substantially determined by its amplification (the P component) and by its damping (the D component). In FIG. 13 a parameter region of this kind in which a stable operation of the control circuit is possible is illustrated for a simple PD control system by way of example. If the rotor is located in air, then a stable operation of the control circuit is possible within the hatched parameter region.

Through an increase in the amplification of the control circuit (increase in the P component) up to the critical amplification $P_{crit}$ or through a lowering of the damping down to the critical damping $D_{crit}$ a boundary-stable behavior can be achieved, that is, the rotor begins to execute continuous oscillations with respect to that regulator axis (there are five such axes: the two axes of horizontal displacement of the rotor in the radial bearing plane, the two tilt axes and the axis of the displacement of the rotor perpendicular to the plane of the bearing) in which the parameter displacement takes place. Through a brief increase in the amplification of the control circuit (P component) or through a brief decrease in the damping (D component) the stability boundary can be found in that it is observed when the continuous oscillations of the rotor with respect to the corresponding regulator axis begin.

If the rotor is now not located in air, but in a liquid, then the critical damping $D_{crit}$ of the control circuit itself is displaced in the direction of a lower critical damping $D'_{crit}$ because of course an additional damping is produced by the liquid. The critical amplification $P_{crit}$ of the control circuit itself is displaced on the contrary in the direction of a higher critical amplification $P'_{crit}$ because a portion of the amplification is "eaten up" by the additional damping of the liquid. The displacement of the stability boundary of the control circuit for the axial magnetic journalling of the rotor is therefore a measure for the liquid damping $D_{FL}$, from which then the viscosity η of the liquid can be determined.

Once the viscosity η of the liquid has been determined in one of the described ways, then—as has already been described above—with the help of the thus determined viscosity η the determination of the through-flow Q from the power-flux characteristics (see FIG. 11) and the subsequent determination of the pressure p from the pressure-through-flow characteristics ("restrictor curves") or the determination of the through-flow Q from the pressure-through-flow characteristics ("restrictor curves") respectively, with the pressure p having previously been determined with the help of the axial forces, can be made even more precisely because the respective viscosity η of the liquid can be taken into account.

What is claimed is:

1. A method for the determination of one of through-flow (Q) of a liquid through a pump and through-flow (Q) as well as pressure (p) of a liquid in a pump the pump having a pump rotor, a drive rotor (1) and a drive stator (2), comprising the steps of:

axially journaling the pump rotor and drive rotor (1) with at least one passive magnetic bearing;

determining the magnetic drive flux ($\Phi_M$) in the gap between the drive rotor (1) and the stator (2);

determining the drive current ($I_A$);

determining the drive torque (M) from the drive flux ($\Phi_M$) and the drive current ($I_A$); and, determining the through-flow (Q) from the drive torque (M) and the speed of rotation (ω) of the rotor.

2. A method for the determination of one of pressure (p) of a liquid in a pump and pressure (p) as well as through-flow (Q) of a liquid through a pump, the pump having a pump rotor (1), comprising the steps of:

axially journaling the pump rotor with at least one magnetic bearing; and, utilizing axial forces acting on the rotor (1) due to a pressure difference between the pump inlet side and the pump outlet side and speed of rotation (ω) to determine pressure (p).

3. A method for the determination of one of through-flow (Q) of a liquid through a pump and though-flow (Q) as well as pressure (p) of a liquid in a pump, the pump having a pump rotor (1), comprising the steps of:

axially journaling the pump rotor (1) with at least one passive magnetic bearing;

determining the axial deflection (z, Δz) of the rotor (1);

determining the drive current ($I_A$);

determining the drive torque (M) from the drive current ($I_A$) and the axial deflection (z, Δz) of the rotor (1); and, determining the through-flow (Q) from the drive torque (M) and the speed of rotation (ω) of the rotor.

4. The method according to claim 2 including the further step of:

using the pressure (p) and the respective speed of rotation (ω) for determining the flow-through (Q) of the pump via the pressure-through-flow characteristics of the pump.

5. The method according to claims 4 or 3 and including the further step of:

determining the viscosity (η) of the liquid in the pump for the determination of the through-flow (Q) from one of the previously established pressure (p) together with the associated speed of rotation (ω) and the torque (M) together with the associated speed of rotation (ω).

6. The method according to claim 5 and including the further steps of:

determining a first liquid pressure (p) by the axial forces which act on the rotor (1);

determining a second liquid pressure (p) from the established torque (M) and the established speed of rotation (ω); and, determining viscosity (η) from the difference of the first liquid pressure and the second liquid pressure and from the associated speed of rotation (ω).

7. The method according to claim 5 including the further steps of:

determining liquid damping ($D_{FL}$) which acts on the rotor (1); and, determining viscosity (η) from the liquid damping ($D_{FL}$).

8. The method in accordance with claim 7 and including the further step of:

determining the liquid damping ($D_{FL}$) with shifting eigen frequencies of the rotor.

9. The method in accordance with claim 7 and including the further steps of:

operating the rotor at an eigen frequency;

measuring the deflection (z, Δz) at the eigen frequency; and, determining the liquid damping ($D_{FL}$) from the deflection (z, Δz).

10. The method in accordance with claim 7 and including the further steps of:

varying the speed of rotation (ω) of the rotor (1) with different frequencies;

determining the variation of the axial bearing forces or of the axial deflection respectively which arises at the respective frequency of variation of the speed of rotation (ω); and, determining the liquid damping ($D_{FL}$) from the variation of the axial bearing forces or of the axial deflection respectively at the different frequencies of variation of the speed of rotation (ω).

11. The method in accordance with claim 7 and including the further steps of:

determining the displacement of the stability boundary of the control circuit for the axial magnetic journaling of the rotor (1); and, determining a liquid damping ($D_{FL}$) from the displacement.

12. The method in accordance with claim 5 and including the further step of:

utilizing determined viscosity (η) for the determination of through-flow (Q).

13. The method according to claim 4 including the further steps of:

storing the pressure-through-flow characteristics of the pump in an electronic look-up table; and, looking up the flow-through (Q) of the pump which results from the determined pressure (p) and the respective speed of rotation.

14. The method according to claim 4 including the further steps of:

representing stored pressure-through-flow characteristics of the pump in a polynomial; and, determining the flow-through (Q) by evaluating the polynomial for the determined pressure (p) and the respective speed of rotation.

15. The method according to claim 2 including the further steps of:

passively journalling the pump rotor (1) with the magnetic bearing for the axial journaling of the pump rotor (1); and, measuring the axial deflection (z, Δz) of the rotor (1) to measure the axial forces on the rotor (1).

16. The method according to claim 3 and including the further steps of:

providing sensors (S1, S2, S3, S4) for the determination of the direction of the magnetic field in the gap between a rotor (1) and a stator (2); and using sensors (S1, S2, S3, S4) for the determination of the axial deflection (z, Δz) of the rotor (1).

17. The method according to claims 15 or 16 wherein the sensors (S1, S2, S3, S4) provided are Hall sensors.

18. The method according to claim 15 and including the further steps of:

storing the measured axial deflections (z, Δz) of the rotor (1) at different speeds of rotation (ω) as well as pressures (p) resulting therefrom in an electronic look-up table;

measuring the axial deflection (z, Δz) of the rotor (1) and speed of rotation (ω) during operation; and, looking up the pressure (p) which results from the axial deflection (z, Δz) and speed of rotation (ω).

19. The method according to claim 15 and including the further steps of:

representing the measured axial deflections (z, Δz) of the rotor (1) at the different speeds of rotation (ω) as well as the pressures resulting therefrom in a polynomial;

measuring the axial deflection (z, Δz) of the rotor (1) and speed of rotation (ω) during operation; and, determining the pressure (p) which results from the measured axial deflection (z, Δz) and speed of rotation (ω) by evaluating the polynomial.

20. The method according to claim 15 and including the further steps of:

providing sensors (S1, S2, S3, S4) for the determination of the direction of the magnetic field in the gap between a rotor (1) and a stator (2); and, using sensors (S1, S2, S3, S4) for the determination of the axial deflection (z, Δz) of the rotor.

21. The method according to claim 2 including the further steps of:

actively journaling the pump rotor (1) with the magnetic bearing for the axial journaling of the pump rotor (1); and, measuring the axial forces on the rotor (1) by measuring the bearing current required for the axial journaling of the rotor.

22. The method according to claim 21 and including the further steps of:

storing the measured bearing currents at different speeds of rotation ($\omega$) as well as pressures resulting therefrom in an electronic look-up table;

measuring the bearing current and speed of rotation ($\omega$) during operation; and, looking up the pressure (p) which results from the bearing current and speed of rotation.

23. The method according to claim 21 and including the further steps of:

representing the measured bearing currents at different speeds of rotation ($\omega$) as well as pressures resulting therefrom in a polynomial;

measuring the bearing current and speed of rotation ($\omega$) during operation; and, determining the pressure (p) which results from the measured bearing current and speed of rotation by evaluating the polynomial.

24. The method according to claim 3 including the further step of:

determining pressure (p) from the already established through-flow (Q) and the associated speed of rotation ($\omega$) via the pressure-through-flow characteristics of the pump.

25. method according to claim 24 including the further steps of:

storing the pressure-through-flow characteristics of the pump in an electronic look-up table; and, determining the pressure (p) from the already established through-flow (Q) and the associated speed of rotation ($\omega$) with the help of the electronic look-up table containing the pressure-through-flow characteristics.

26. The method according to claim 25 including the further steps of:

approximating the pressure-through-flow characteristics with a polynomial; and, determining the pressure (p) by evaluating the polynomial for the established through-flow (Q) and the associated speed of rotation ($\omega$).

27. The method according to claim 3 and including the further steps of:

storing different drive currents ($I_A$) at different axial deflections (z, $\Delta z$) of the rotor and the respective torque (M) resulting therefrom in an electronic look-up table;

measuring the axial deflection (z, $\Delta z$) of the rotor (1) and the respective drive current ($I_A$) during operation of the pump;

determining the torque (M) from the drive current ($I_A$) and the axial deflection (z, $\Delta z$) of the rotor (1) with the help of the look-up table; and, determining the through-flow (Q) through the pump from the torque (M) and the speed of the rotation ($\omega$) of the rotor.

* * * * *

UNITED STATES PATENT AND TRADEMARK OFFICE
CERTIFICATE OF CORRECTION

PATENT NO.    : 6,634,224 B1
DATED         : October 21, 2003
INVENTOR(S)   : Reto Schöb et al.

It is certified that error appears in the above-identified patent and that said Letters Patent is hereby corrected as shown below:

Column 6,
Line 41, delete "$k_3\omega$" and insert therefor -- $k_3\omega z$ --.

Column 9,
Lines 15, 19, 27 and 64, delete " Φ" and insert therefor -- $\omega$ --.

Column 16,
Line 9, delete "25" and insert therefor -- 24 --.

Signed and Sealed this

Twenty-seventh Day of April, 2004

JON W. DUDAS
*Acting Director of the United States Patent and Trademark Office*